United States Patent [19]

Arand et al.

[11] 4,325,924

[45] Apr. 20, 1982

[54] UREA REDUCTION OF $NO_x$ IN FUEL RICH COMBUSTION EFFLUENTS

[75] Inventors: John K. Arand, Rancho Palos Verdes; Lawrence J. Muzio, Laguna Niguel; Donald P. Teixeira, Los Altos, all of Calif.

[73] Assignee: Electric Power Research Institute, Inc., Palo Alto, Calif.

[21] Appl. No.: 844,556

[22] Filed: Oct. 25, 1977

[51] Int. Cl.³ .......................................... B01D 53/00
[52] U.S. Cl. ........................................................ 423/235
[58] Field of Search ....................... 423/235, 213.2, 351

[56] References Cited

U.S. PATENT DOCUMENTS

| | | | |
|---|---|---|---|
| 3,599,427 | 8/1971 | Jones et al. | 423/213.5 |
| 3,900,554 | 8/1975 | Lyon | 423/235 |
| 4,061,597 | 12/1977 | Goldstein et al. | 423/235 |

FOREIGN PATENT DOCUMENTS

| | | | |
|---|---|---|---|
| 2630202 | 2/1977 | Fed. Rep. of Germany | 423/235 |
| 50-23664 | 9/1975 | Japan | 423/235 |
| 52-85056 | 7/1977 | Japan . | |

OTHER PUBLICATIONS

Chem. Abstr.-vol. 86-#160380.
Chem. Abstr.-vol. 87-#156399.
Chem. Abstr.-vol. 88-#40976.

*Primary Examiner*—G. O. Peters
*Attorney, Agent, or Firm*—Bertram I. Rowland

[57] ABSTRACT

Method of reducing $NO_x$ in fuel rich combustion effluents is provided comprising introducing urea at temperatures in excess of about 1900° F. in the presence of excess fuel, wherein said urea is introduced either as a solid or solution in amounts sufficient to reduce the $NO_x$ concentration.

8 Claims, No Drawings

UREA REDUCTION OF NO$_x$ IN FUEL RICH COMBUSTION EFFLUENTS

This invention was made under contract with or supported by the Electric Power Research Institute, Inc. of Palo Alto, California.

BACKGROUND OF THE INVENTION

1. Field of the Invention

A major contributor to air pollution are the combustion products of fossil fuels. Included among the combustion products is nitric oxide, which is involved in the formation of photochemical smog. The nitric oxide is oxidized in the atmosphere to nitrogen dioxide, which subsequently reacts with hydrocarbons in the presence of sunlight to form photochemical smog.

Combustion products from automotive internal combustion engines, fossil fuel power plants, process furnaces, incinerators, and the like all contribute to the production of nitric oxide. Control of nitric oxide production has been directed toward modifications in the combustion process or removal of the nitric oxide from the combustion products prior to discharge into the atmosphere.

There have been numerous efforts to effectively remove nitric oxide from combustion effluents. However, there are many constraints in an appropriate system. The actual concentration of nitrogen oxides is low, so that a chemical scavenger must be very efficient to be at all economical. Secondly, it is desirable that the removal be relatively simple with and relatively inexpensive. Finally, the products should be innocuous.

2. Description of the Prior Art

U.S. Pat. No. 3,900,554 discloses the use of ammonia for reducing nitric oxide.

SUMMARY OF THE INVENTION

Combustion effluents containing excess fuel and oxides of nitrogen are contacted with urea, either in solid form or in solution in an hydroxylic solvent, at a temperature in excess of 1900° F., the urea being in an amount sufficient to significantly reduce the oxides of nitrogen concentration in the effluent.

DESCRIPTION OF THE SPECIFIC EMBODIMENTS

The subject invention provides a method for selective reduction of oxides of nitrogen particularly, nitric oxide, in the presence of excess fuel (a reducing atmosphere) at temperatures in excess of 1900° F. in combustion effluents. The combustion effluent may be from any combustion device. This includes utility power plant, boilers, industrial and commerical boilers, process furnaces, MHD combustors, stationary and mobile gas turbine engines, stationary and mobile spark ignited and diesel engines, incinerators and any combination thereof, such as supplementary-fired combined cycle power plants. The combustion effluent must be at a temperature of at least about 1900° F., preferably at a temperature of at least about 2000° F. and will generally be below 3000° F., more usually below about 2500° F.

In carrying out the subject invention, the urea is injected into the combustion effluent stream so as to provide substantially uniform distribution of the urea in the effluent stream. By combustion effluent is intended those gases which flow out from a region of combustion, either from flame or catalytic combustion.

The equivalence ratio of fuel to oxygen will be greater than 1, more usually greater than 1.05:1 and generally less than about 1.5, usually not exceeding about 1.25. The amount of the urea which is employed will generally be from about 0.5 to 10 moles of urea per mole of nitric oxide, preferably from about 0.75 to 6 moles of urea per mole of nitric oxide.

The pressure at which the process is carried out is not critical and may be varied widely. Generally, the pressures will be from about 0.1 to 100 atmospheres. The residence time of the reaction will generally range from about 0.001 to 10 seconds. The urea which is injected into the stream may be injected as a finely divided powder, molten urea as a fine spray, or a urea solution as a fine spray. The urea solution may range widely in concentration, up to saturation, but will generally be not less than about 10 weight percent, preferably not less than about 20 weight percent. Single solvents or mixtures of solvents may be employed. Desirably, a reducing compound, such as an alkanol of 1 to 3 carbon atoms e.g. methanol may be employed. Other solvents include water, ketones of from 3 to 4 carbon atoms, and the like.

Besides a reducing solvent, other reducing compounds may also be employed in combination with the urea. Such materials include paraffinic, olefinic, and aromatic hydrocarbons and mixtures thereof e.g. gasoline and fuel oil, oxygenated hydrocarbons, including lower mono- and dibasic acids, e.g. formic and oxalic acids, substituted hydrocarbons, carbon monoxide and hydrogen. Of this group, hydrogen is the most preferred.

The amount of hydrogen will generally be limited, since it is found that hydrogen reduces the selectivity of the urea. The mole ratio of hydrogen to urea should be less than about 10, preferably less than about 3.

The injection of the urea into the combustion effluent stream may be in a single charge or be made by incremental addition. Generally, the urea will be added in not more than about 5 increments, usually not more than about 3 increments. That is, the urea may be added at various stages along the flow path of the combustion effluent or at a single stage. At each stage, the same requirements of temperature are applicable.

In order to demonstrate the subject invention, a number of tests were carried out. These tests were conducted with the primary combustion products at an equivalence ratio of 1.2:1 (fuel to oxygen) and temperatures of 1980° F. and 2140° F. Known amounts of natural gas and air were combusted in an 8-inch diameter combustion tunnel. Nitric acid was added to the air to control the amount of nitric oxide at the point where the urea was injected. The temperature at the point of the urea injection was measured with a thermocouple and controlled by varying the amounts of fuel and air burned. The amount of oxygen present was also controlled by varying the relative amount of air and natural gas. The urea was contacted with the stream of combustion products by dissolving in water and spraying the urea solution into the combustion tunnel. During these experiments, the water injection rate was held constant and the urea concentration in the solution varied.

The following table indicates the results.

FUEL RICH UREA TEST SUMMARY

Combustion Tunnel Conditions primary fuel natural gas equivalence ratio: φ–1.2 reducing agent: urea (in solution)

| INITIAL CONDITIONS | | | OUTPUT | | |
|---|---|---|---|---|---|
| Temp. °F. | (Urea)/(NO) molar ratio | NO ppm | NO final / NO initial | $NH_3$ ppm | CN ppm |
| 1980 | 0.49 | 350 | 0.93 | 592 | 46 |
| ↓ | 0.97 | 350 | 0.83 | 840 | 47 |
| ↓ | 1.93 | 350 | 0.85 | 1100 | 26 |
| ↓ | 4.80 | 360 | 0.75 | 3600 | 47 |
| 2140 | 0.51 | 315 | 1.0 | 68 | — |
| ↓ | 0.51 | 330 | 0.96 | — | 18 |
| ↓ | 1.01 | 330 | 0.97 | 154 | — |
| ↓ | 0.92 | 350 | 0.92 | — | 29 |
| ↓ | 1.94 | 335 | 0.85 | 495 | — |
| ↓ | 2.10 | 310 | 0.68 | — | 31 |
| ↓ | 1.97 | 330 | 0.73 | 690 | — |
| ↓ | 5.25 | 310 | 0.32 | 2980 | — |
| ↓ | 5.15 | 315 | 0.35 | — | 41 |

The primary product of the reaction of urea and $NO_x$ is nitrogen.

The above data demonstrate that urea is capable of reacting with nitric oxide to efficiently reduce the amount of $NO_x$ present in the effluent.

The subject invention provides a number of advantages employing as a reductant a solid, inert, noncorrosive material which is easily, handled, stored and can be readily introduced into a combustion product stream, either as a solid or in solution, optionally with an ancillary reducing material. The urea can be safely employed with mobile combustion devices, being stored and used either as a solution or as a dry powder.

The urea can be introduced into various parts of combustion devices without significant corrosive effects. For example, the urea can be injected in the superheater region of a boiler or in a exhaust manifold or combustion chamber of a diesel engine.

Although the foregoing invention has been described in some detail by way of illustration and example for purposes of clarity of understanding, it will be obvious that certain changes and modifications may be practiced within the scope of the appended claims.

What is claimed is:

1. A process for selectively reducing nitrogen oxides in a combustion effluent, comprising:
   contacting with urea a nitrogen oxide containing effluent stream having an equivalence ratio of fuel over oxygen, greater than one wherein said urea is present in an amount of from about 0.5 to 10 moles per mole of nitrogen oxide at a temperature in the range of about 1900° to 3000° F.

2. A method according to claim 1, wherein an ancillary reducing material is introduced concurrently with said urea.

3. A method according to claim 1, wherein said urea is present in from about 0.75 to 6 moles per mole of nitrogen oxide.

4. A method according to claim 3, wherein the equivalence ratio of fuel to oxygen is in the range of 1.05-1.5:1.

5. A method according to claim 1, wherein said urea is introduced as a fine molten spray into said effluent stream.

6. A method according to claim 1, wherein said urea is introduced as a solution.

7. A method according to claim 6, wherein said solution is aqueous.

8. A method according to claim 6, wherein said solution is alkanolic.

* * * * *